(12) United States Patent
Davis et al.

(10) Patent No.: US 11,219,156 B2
(45) Date of Patent: Jan. 11, 2022

(54) DISTRIBUTED PUMP SYSTEM

(71) Applicant: Deere & Company, Moline, IL (US)

(72) Inventors: Ryan P. Davis, Des Moines, IA (US); Richard A. Humpal, Ankeny, IA (US); Patrick J. Fisher, Naples, FL (US)

(73) Assignee: DEERE & COMPANY, Moline, IL (US)

( * ) Notice: Subject to any disclaimer, the term of this patent is extended or adjusted under 35 U.S.C. 154(b) by 450 days.

(21) Appl. No.: 15/996,871

(22) Filed: Jun. 4, 2018

(65) Prior Publication Data

US 2019/0124827 A1  May 2, 2019

Related U.S. Application Data

(60) Provisional application No. 62/578,591, filed on Oct. 30, 2017.

(51) Int. Cl.
*A01C 23/00* (2006.01)
*B05B 12/08* (2006.01)
(Continued)

(52) U.S. Cl.
CPC ........ *A01C 23/007* (2013.01); *A01M 7/0089* (2013.01); *B05B 1/20* (2013.01);
(Continued)

(58) Field of Classification Search
CPC ....... B05B 1/20; B05B 12/004; B05B 12/006; B05B 12/1418; B05B 12/0423;
(Continued)

(56) References Cited

U.S. PATENT DOCUMENTS 3,782,634 A * 1/1974 Herman .................. E01H 3/02
239/156
3,933,277 A * 1/1976 Volat ................... A01M 7/0089
222/627
(Continued)

FOREIGN PATENT DOCUMENTS

EP         0800758 A1    10/1997

OTHER PUBLICATIONS

European Search Report issued in counterpart application No. 18203268.0 dated Mar. 4, 2019. (7 pages).
(Continued)

*Primary Examiner* — Joseph A Greenlund (57) ABSTRACT

A distributed pump system is disclosed. The distributed pump system comprises a supply source and a support structure arranged on or proximate an agricultural vehicle. At least two fluid distribution elements are mounted to the support structure and are coupled at an inlet to a first conduit to provide fluid communication between the fluid distribution elements and the supply source. An application system including at least two application units is coupled to one or more of the fluid distribution elements by a second conduit. A first monitoring device is associated with a respective application unit and fluid distribution element, and is configured to sense a downstream flow parameter of the second conduit and generate a corresponding output signal. An electronic control unit is communicatively coupled to each of the fluid distribution elements and is configured to dynamically adjust an input parameter of one or more of the fluid distribution elements.

16 Claims, 6 Drawing Sheets

(51) Int. Cl.
  *B05B 12/14* (2006.01)
  *A01M 7/00* (2006.01)
  *G05D 7/06* (2006.01)
  *B05B 12/00* (2018.01)
  *B05B 1/20* (2006.01)
(52) U.S. Cl.
  CPC .......... *B05B 12/004* (2013.01); *B05B 12/006* (2013.01); *B05B 12/085* (2013.01); *B05B 12/1418* (2013.01); *G05D 7/0688* (2013.01)
(58) Field of Classification Search
  CPC ..... A01C 23/07; A01C 23/007; A01C 23/008; A01C 23/024; A01M 7/0089
  See application file for complete search history.

(56) References Cited

U.S. PATENT DOCUMENTS

| | | | | | |
|---|---|---|---|---|---|
| 4,199,303 | A * | 4/1980 | Gusmer | ................ | B05B 7/0018 137/101.21 |
| 4,260,107 | A * | 4/1981 | Jackson | .............. | A01M 7/0089 239/124 |
| 4,530,463 | A * | 7/1985 | Hiniker | ..................... | B05B 9/06 239/155 |
| 4,630,773 | A * | 12/1986 | Ortlip | ................. | A01B 79/005 239/1 |
| 5,433,380 | A * | 7/1995 | Hahn | ................. | A01M 7/0085 134/169 R |
| 5,520,333 | A * | 5/1996 | Tofte | .................... | A01B 79/005 137/599.05 |
| 5,911,362 | A * | 6/1999 | Wood | ................. | A01M 7/0089 239/1 |
| 5,971,294 | A * | 10/1999 | Thompson | .............. | B05B 12/04 239/163 |
| 6,036,107 | A * | 3/2000 | Aspen | ................. | A01M 7/0089 137/883 |
| 6,062,496 | A * | 5/2000 | Kinter | ................. | A01M 7/0089 239/462 |
| 7,108,196 | B2 * | 9/2006 | Kime | .................... | E01H 10/007 239/1 |
| 7,124,961 | B2 * | 10/2006 | Wilting | ............... | A01M 7/0089 239/124 |
| 7,845,914 | B2 * | 12/2010 | Engelbrecht | ............ | F04D 13/12 417/203 |
| 7,934,680 | B2 * | 5/2011 | Smith | .................. | G05D 11/139 244/134 C |
| 8,800,887 | B2 * | 8/2014 | Moeller | .............. | A01M 7/0089 239/159 |
| 8,864,053 | B2 * | 10/2014 | Anderton | .................. | B05B 1/30 239/456 |
| 8,868,300 | B2 * | 10/2014 | Kocer | .................. | A01C 21/005 701/50 |
| 8,880,362 | B2 * | 11/2014 | Wilkens | .................... | B05B 9/06 702/47 |
| 9,046,895 | B2 * | 6/2015 | Orr | ........................... | E02F 9/24 |
| 9,113,591 | B2 * | 8/2015 | Shivak | .................. | A01C 23/042 |
| 9,445,540 | B2 * | 9/2016 | Ballu | .................. | A01M 7/0089 |
| 9,554,506 | B2 * | 1/2017 | Bittner | ................ | A01M 7/0089 |
| 10,306,879 | B2 * | 6/2019 | Proharam | ........... | A01M 7/0092 |
| 10,368,538 | B2 * | 8/2019 | Preheim | ............ | B05B 12/08 |
| 10,369,585 | B2 * | 8/2019 | Brooks | .................. | A01M 7/0042 |
| 10,485,229 | B2 * | 11/2019 | Hammer | .............. | A01M 7/0089 |
| 2002/0099471 | A1 * | 7/2002 | Benneweis | .......... | A01C 23/047 700/237 |
| 2006/0273189 | A1 * | 12/2006 | Grimm | ................. | B05B 9/0423 239/146 |
| 2007/0187527 | A1 * | 8/2007 | Knight | ................ | A01M 7/0089 239/127 |
| 2011/0077784 | A1 * | 3/2011 | Lips | ..................... | A01C 23/007 700/283 |
| 2013/0153676 | A1 * | 6/2013 | Ballu | .................. | A01C 23/007 239/11 |
| 2013/0320105 | A1 * | 12/2013 | Schmidt | ................. | A01G 25/16 239/1 |
| 2013/0333601 | A1 * | 12/2013 | Shivak | ................. | G05D 7/0664 111/118 |
| 2014/0263709 | A1 * | 9/2014 | Kocer | .................. | B05B 12/085 239/11 |
| 2014/0277780 | A1 * | 9/2014 | Jensen | .................. | B05B 12/085 700/283 |
| 2017/0006852 | A1 * | 1/2017 | Engelbrecht | ........ | A01M 7/0042 |
| 2017/0106386 | A1 * | 4/2017 | Milo | ..................... | B05B 13/005 |
| 2017/0120263 | A1 * | 5/2017 | Needham | ............ | F16K 31/0655 |
| 2017/0274400 | A1 * | 9/2017 | Kowalchuk | ........... | B05B 12/082 |
| 2018/0139895 | A1 * | 5/2018 | Brechon | ............. | A01C 23/007 |
| 2019/0009285 | A1 * | 1/2019 | Zimmerman | ....... | A01M 7/0042 |
| 2019/0098888 | A1 * | 4/2019 | Murphy | .............. | B05B 12/004 |
| 2019/0124827 | A1 * | 5/2019 | Davis | .................... | B05B 12/004 |
| 2019/0257678 | A1 * | 8/2019 | Posselius | .............. | B05B 12/004 |
| 2019/0321844 | A1 * | 10/2019 | Schrader | ................ | H01F 7/064 |
| 2020/0196520 | A1 * | 6/2020 | Schoeny | .............. | A01C 23/007 |
| 2021/0176976 | A1 * | 6/2021 | Glasbrenner | ......... | B05B 13/005 |

OTHER PUBLICATIONS

European Search Report issued in counterpart application No. 18203271.4 dated Mar. 4, 2019. (8 pages).

* cited by examiner

DISTRIBUTED PUMP SYSTEM

FIELD OF THE DISCLOSURE

The present disclosure relates generally to solution systems, and, more particularly to a distributed pump system for agricultural sprayers.

BACKGROUND OF THE DISCLOSURE

In large sprayer applications, several materials or solutions, such as nutrients, herbicides, paints, chemicals and other liquids, are applied to agricultural crops or industrial surfaces. Due to the large amounts of fluid and different fluid solutions involved, the control pumps for fluid filling, cleansing, mixing, agitating, spraying and pressurizing are very complicated, bulky, heavy and expensive. Further, the conversation of materials and solutions is becoming more important for customers to save money and to reduce the environmental impact, as well as to address environmental regulations imposed by different countries. For example, regulations may vary by country as to the type of fluids and concentration levels that may be used in large sprayer applications.

To address such concerns, some conventional approaches have employed the use of application systems that provide solution to a boom by one main supply line via a chassis mounted pump that provides the flow for all functions (spraying, loading, agitating, educating, rinsing). Drawbacks to such approaches include non-uniform spray applications and limited to single spray.

To overcome these drawbacks, other conventional approaches have employed the use of dual pumps and manifolds that allow for two different applications at one time. Due to the plumbing and piping arrangement of such systems, system pressures become difficult to control, thereby resulting in uneven pressure distribution across the spray boom and therefore an uneven application rate. For example, as spray booms become wider the problem of uneven distribution is amplified due to head pressures from elevation differences from the pressure transducer to the outer most spray nozzle. This occurs both when the spray boom wing is tilted to compensate for elevation changes and when the sprayer is applying with the boom down an incline.

As such, there is a need in the art for an improved solution system that overcomes the limitations of the conventional approaches and that provides for spot spraying and increased application uniformity.

SUMMARY OF THE DISCLOSURE

According to an aspect of the present disclosure, a distributed pump system is disclosed. The distributed pump system can comprise a supply source and a support structure arranged on or proximate an agricultural vehicle movable across a field. At least two fluid distribution elements are mounted to the support structure and coupled at an inlet to a first conduit to provide fluid communication between the fluid distribution elements and the supply source. An application system is arranged downstream of the fluid distribution elements and includes at least two application units each having a plurality of dispensing nozzles coupled thereto. Each application unit is respectively coupled to one or more of the fluid distribution elements by a second conduit. At least one first monitoring device coupled to the second conduit and is associated with a respective application unit and fluid distribution element. The at least one first monitoring device is configured to sense a downstream flow parameter of the second conduit and generate a corresponding output signal. An electronic control unit is communicatively coupled to each of the fluid distribution elements and is configured to dynamically adjust an input parameter of one or more of the fluid distribution elements when the sensed downstream flow parameter is above or below a predetermined threshold to maintain a desired spray output of the plurality of dispensing nozzles.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1A:
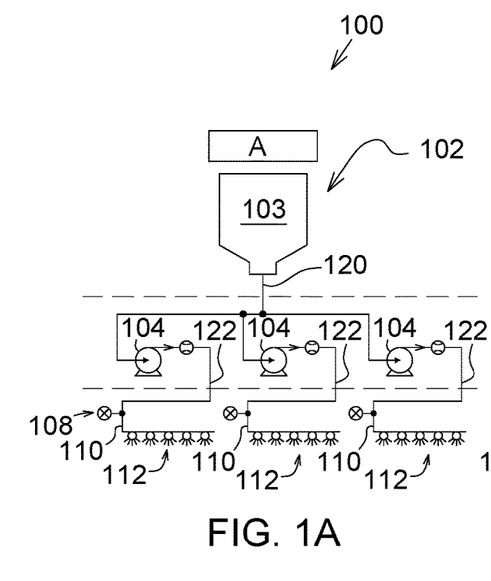
FIG. 1A is a schematic illustration of a distributed pump system according to an embodiment.
Figure 1B:
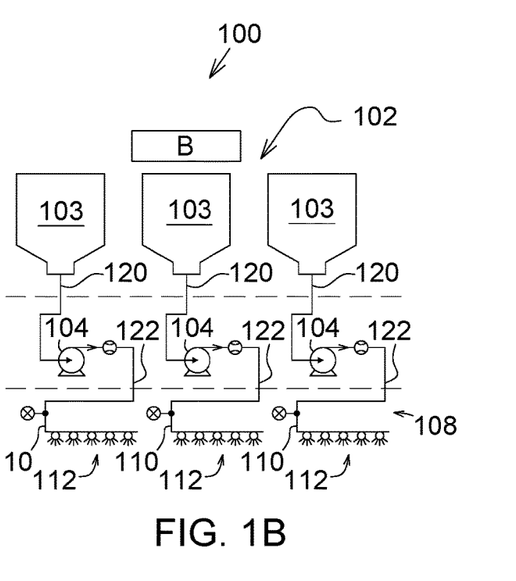
FIG. 1B is a schematic illustration of the distributed pump system of FIG. 1A according to an embodiment.
Figure 1C:
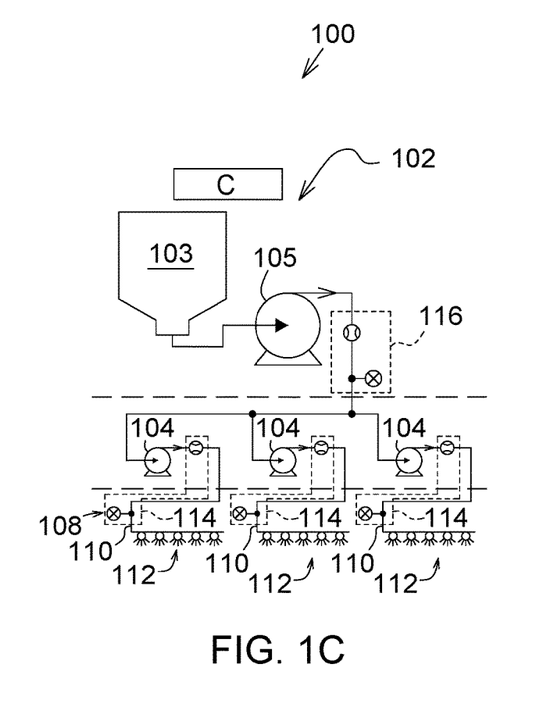
FIG. 1C is a schematic illustration of the distributed pump system of FIG. 1A according to an embodiment.
Figure 2:
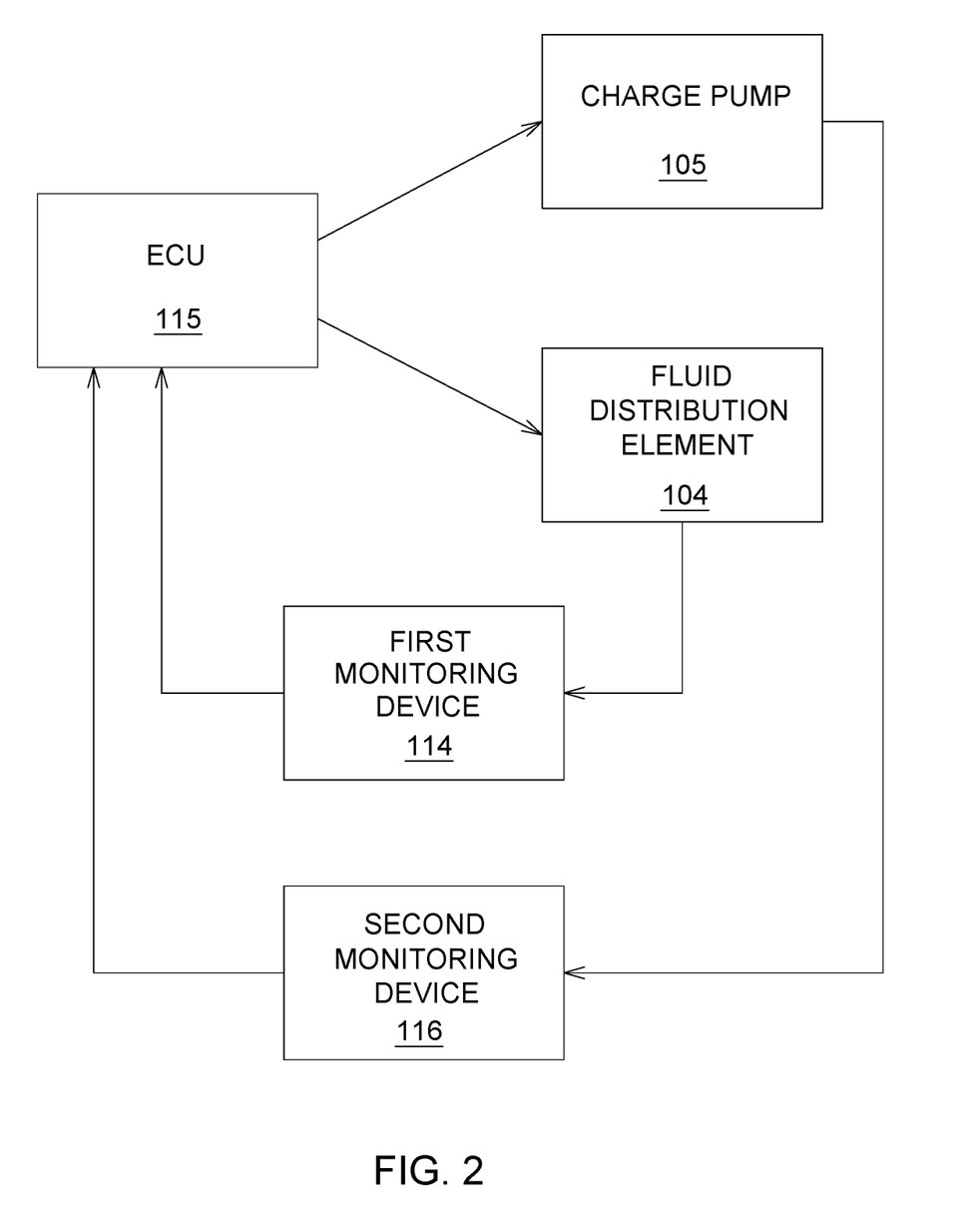
FIG. 2 is a block diagram of a control system used in the distributed pump system of FIG. 1A according to an embodiment.

Referring to FIGS. 1A-2, a schematic illustration of a distributed pump system 100 for use with an agricultural sprayer 500 is shown according to an embodiment. Although the distributed pump system 100 is shown as being incorporated in an agricultural sprayer system, it should be noted that system 100 may be incorporated in other application systems such as seeding, cultivating, or planting and that embodiments discussed herein are merely for exemplary purposes to aid in an understanding of the present disclosure.

In embodiments, the distributed pump system 100 can comprise a plurality of fluid distribution elements 104 fixedly or removably coupled to a support structure 106, which are arranged to receive a supply of applicator solution from a supply source 102 for distribution to an application system 108. At least one first monitoring device 114 can be arranged proximate the application system 108 and is used to monitor flow parameters of the distributed pump system 100 for feedback to an electronic control unit 115 to allow for automated and adaptive control of the fluid distribution elements 104.

Figure 7A:
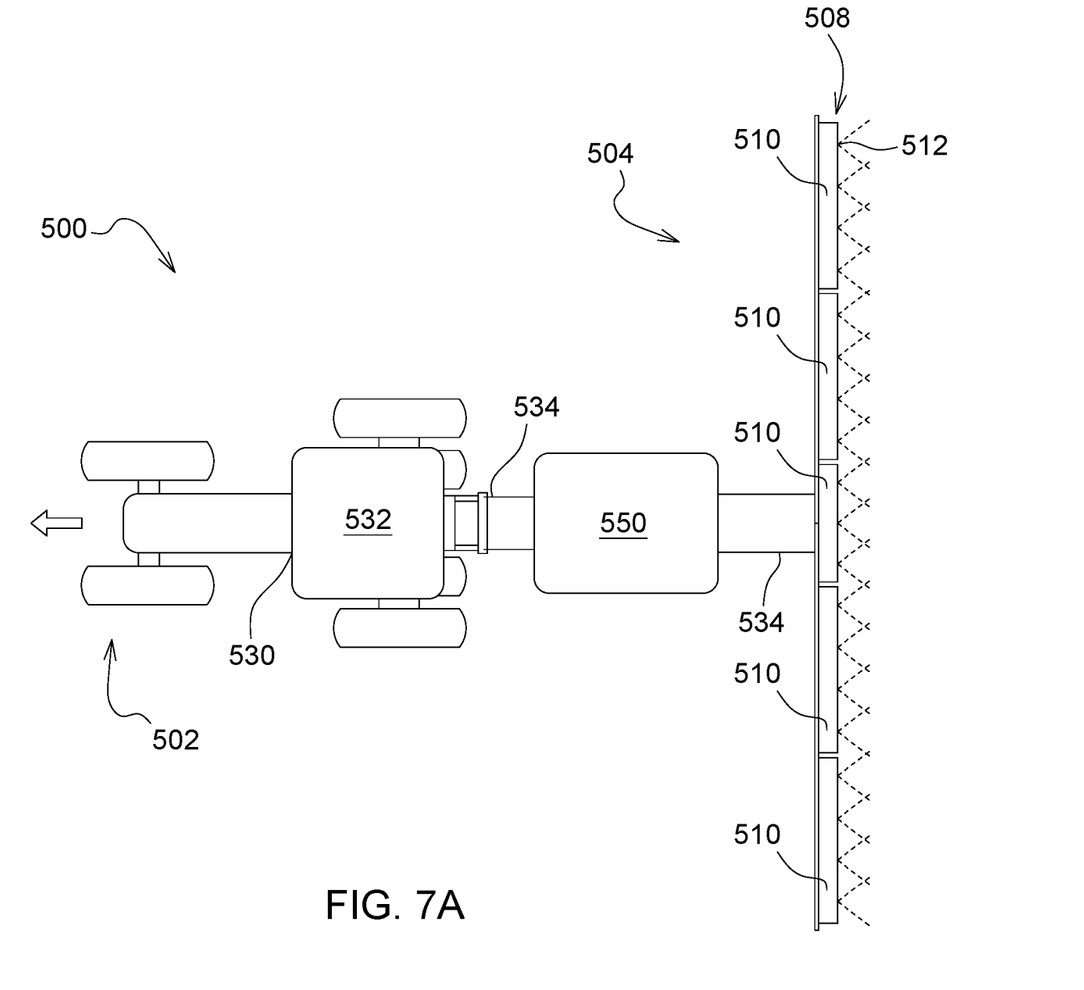
FIG. 7A is an illustration of a distributed pump system in use with an agricultural sprayer.

In some embodiments, the supply source 102 can be arranged upstream of the plurality of fluid distribution elements 104 and can comprise one or more solution reservoirs 103 arranged on or proximate an agricultural vehicle 502 (refer, e.g., to FIG. 7A). In other embodiments, the supply source 102 can further comprise a charge pump 105 arranged an outlet of the one or more solution reservoirs 103 (FIG. 1C) that is configured to provide a flow of pressurized applicator solution to downstream components (e.g., fluid distribution elements 104 and application units 110) to maintain a desired system pressure. At least one second monitoring device 116 can be arranged proximate an outlet of the charge pump 105 to monitor flow parameters of the first conduit 120.

As depicted in FIGS. 1A-1C, the plurality of fluid distribution elements 104 can be arranged in fluid communication with the supply source 102 via a first conduit 120. For example, the plurality of fluid distribution elements 104 can be adjacently arranged to receive a supply of applicator solution (e.g., nutrients, herbicides, chemicals, etc.) from either a shared (FIGS. 1A and 1C) or dedicated (FIG. 1B) supply source 102. In some embodiments, the fluid distribution elements 104 can comprise one or more hydraulic and/or electric pumps such as centrifugal pumps, variable displacement pumps, fixed displacement pumps, or combinations thereof, which are sized and scaled according to a variety of application and specification requirements.

As discussed above, each of the plurality of fluid distribution elements 104 can be coupled to the support structure 106, which can comprise structural elements of the agricultural vehicle 502 or of apparatuses attached thereto (e.g., a vehicle chassis or a boom assembly). The structural arrangement and layout of the fluid distribution elements 104, as well as supply source 102, can and will vary based on the selected support structure 106 design. For example, in embodiments in which the support structure 106 comprises a vehicle chassis, each of the fluid distribution elements 104 can be adjacently arranged and positioned to receive fluid directly from the solution reservoirs 103 (i.e., supply source 102 is directly coupled to the fluid distribution elements 104 via the first conduit 120).

In other embodiments, such as when the support structure 106 comprises the boom assembly, the plurality of fluid distribution elements 104 can be mounted directly to the boom assembly and can be supplied via the charge pump 105 rather than receiving a direct supply of applicator solution from the solution reservoirs 103.

The application system 108 can comprise a plurality of application units 110 each having one or more dispensing nozzles 112 arranged to distribute the supply of applicator solution over an agricultural field. In some embodiments, each application unit 110 can be coupled to one or more of the fluid distribution elements 104 via a second conduit 122. The first monitoring device 114 can be coupled to the second conduit 122 proximate an outlet of the fluid distribution elements 104 and arranged upstream of the application system 108. In various embodiments, the first monitoring device 114 can comprise a variety of sensor devices such as, e.g., pressure sensors, pressure transducers, flow meters, velocity meters, or combinations thereof, which are configured to measure system flow parameters and provide feedback signals to the electronic control unit 115.

As illustrated in FIG. 2, the electronic control unit 115 can be communicatively coupled to the first and second monitoring devices 114, 116, fluid distribution elements 104, and charge pump 105, and can be configured to generate an output signal to dynamically adjust an input parameter of each of the fluid distribution elements 104 and/or charge pump 105 based on the feedback signal generated by the first and second monitoring devices 114, 116. The electronic control unit 115 can comprise a microprocessor, a microcontroller, a digital signal processor, a programmable logic controller, or other suitable computing devices that is arranged locally on the agricultural vehicle 502 or remotely at a remote processing facility.

As will be appreciated by those skilled in the art, FIGS. 1A-2 are provided merely for illustrative and exemplary purposes and are in no way intended to limit the present disclosure or its applications. In other embodiments, the component sizing and capacities, arrangement and/or structural configuration of the distributed pump system 100 can and will vary according to application and specification requirements. For example, in some embodiments, the distributed pump system 100 can comprise fewer or more monitoring devices 114, 116 as will be discussed with reference to FIGS. 3-6. Additionally, although in embodiments herein, system 100 is illustrated as comprising three fluid distribution elements 104, in other exemplary embodiments, fewer or more fluid distribution elements 104 may be used.

Figure 3:
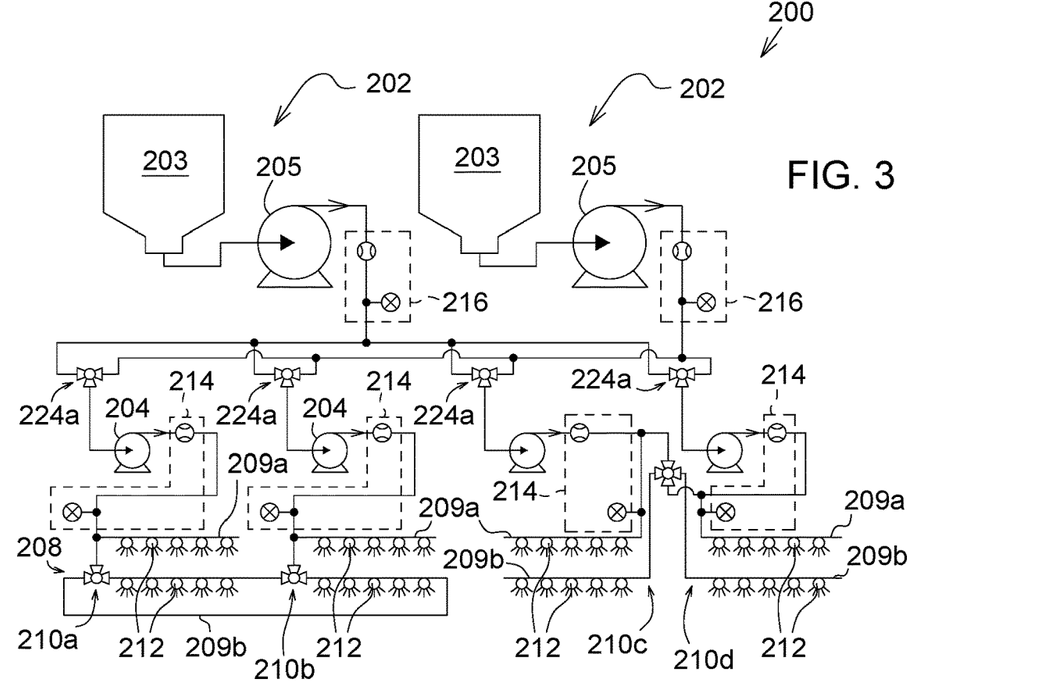
FIG. 3 is a schematic illustration of a distributed pump system according to an embodiment.

Referring to FIG. 3, a schematic illustration of a distributed pump system 200 is shown according to an embodiment. The distributed pump system 200 is substantially similar to the embodiments discussed above with reference to system 100. Like reference numerals will be used to designate similar features. In embodiments, the distributed pump system 200 can further comprise a plurality of flow control devices 224 coupled to the first and/or second conduits 220 or 222 to achieve a redundant and high resolution distribution system as shown in FIG. 3. The flow control devices 224 can be communicatively coupled to the electronic control unit 115 and can comprise a variety of valve configurations (e.g., two-way or three-way valves).

In some embodiments, a main flow control device 224a can be arranged to selectively distribute the applicator solution from a desired supply source 202a, 202b to the fluid distribution elements 204. Similarly, an auxiliary flow control device 224b can be arranged to selectively distribute the applicator solution received at the fluid distribution elements 204 to the application system 208. In embodiments, the application system 208 can comprise one or more dual nozzle application units 210a-210d each comprising a first portion 209a and a second portion 209b with a plurality of dispensing nozzles 212 arranged thereon. The first portion 209a can be coupled directly to the second conduit 222, and the second portion 209b can be coupled to the auxiliary flow control device 224b.

As previously discussed, supply sources 202a, 202b can be configured to contain the same or different applicator solutions in order to provide for single or dual spray applications. For example, for redundant and single spray applications, each of supply sources 202a, 202b can be configured to contain substantially similar applicator solutions that are supplied to the fluid distribution elements 204 in an alternating manner. In other embodiments, e.g., such as high resolution spray applications, the entire arrangement of fluid distribution elements 204 can be supplied by a single supply source (e.g., supply source 202a or supply source 202b) rather than collective utilizing both sources. For dual application systems, two distinct applicator solutions can be simultaneously or sequentially applied to the application system 208 from a respective supply source 202a or 202b. For example, supply source 202a can be configured to contain a first applicator solution (e.g., nitrogen) that is supplied to dual nozzle application units 210a and 210b, and supply source 202b can be configured to contain a second applicator solution (e.g., a fungicide) that is supplied to dual nozzle application units 210c and 210d.

In operation, and utilizing either of the above embodiments, the main and auxiliary flow control devices 224a, 224b can be selectively actuated and de-actuated between a first position and a second position via an operator input to establish a corresponding flow path between a respective supply source 202a, 202b, fluid distribution element 204, and application unit 210a-210d. For example, if a high resolution spray application is desired, each auxiliary flow control device 224b will be operated in the first position to allow solution to be directed out of the dispensing nozzles 212 arranged on the second portion 209b simultaneously with those arranged on the first portion 209a for each application unit 210a-210d.

In contrast, if an operator selects a two solution application in which different applicator solutions are applied or applied at different rates simultaneously, each auxiliary flow control device 224b will operate in the second position to allow solution to be directed out of the dispensing nozzles 212 arranged on the second portion 209b simultaneously with those arranged on the first portion 209a of adjacent application units 210a-210d simultaneously (i.e., entire assembly).

In other embodiments, the distributed pump system 200 can be configured without the main and auxiliary flow control devices 224a, 224b similar to system 100, which would remove the capability to actively control selection of supply sources 202a, 202b.

Figure 4:
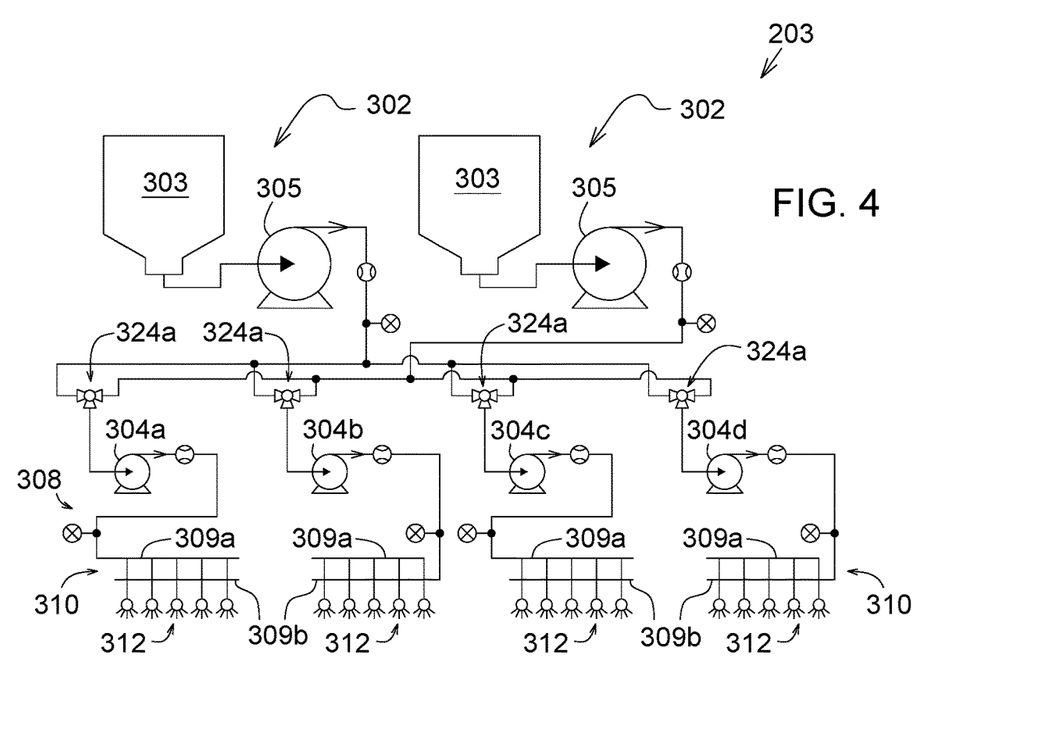
FIG. 4 is a schematic illustration of a distributed pump system according to an embodiment.

Referring now to FIG. 4, a distributed pump system 300 is shown according to an embodiment. In embodiments, the distributed pump system 300 can be configured to combine both the high resolution and dual spray application features of distributed pump system 200. The arrangement and configuration of supply sources 302 and fluid distribution elements 304a-304d are substantially similar to that of system 200, however, the application units 310 of the distributed pump system 300 further comprises a split path conduit 309.

The split path conduit 309 of each application unit 310 comprises a first conduit portion 309a and a second conduit portion 309a coupled to a plurality of dispensing nozzles 312. As depicted, the first portion 309a is arranged in fluid communication with a first fluid distribution element (e.g., fluid distribution element 304a or 304c) and a second conduit portion 309b arranged in fluid communication with a second fluid distribution element (e.g., fluid distribution element 304b or 304d). In such arrangement, each of the dispensing nozzles 312 can be supplied by either the first or the second fluid distribution element. In some embodiments, the dispensing nozzles 312 can comprise a plurality of intelligent nozzles that are configured to selectively open to and pull from either the first or second conduit portions 309a or 309b based on a desired spray application. For example, in a high resolution application, a first half of the dispensing nozzles 312 arranged on application unit 310 can be supplied via the first conduit portion 309a, and a remaining half of the dispensing nozzles 312 can be supplied second conduit portion 309b or vice versa. This provides for recirculation of the application solution through the use of the intelligent dispensing nozzles 312.

For example, during recirculation, each of the dispensing nozzles 312 can be operated in a recirculation mode, wherein an outlet of each of the dispensing nozzles 312 is configured in a closed position and at least two corresponding inlets of the nozzles 312 are configured in an open position such that a supply of applicator solution is received from both the first and second conduit portions 309a, 309b. Additionally, in recirculation mode, the first fluid distribution element (e.g., 304a or 304c) and the second fluid distribution elements (e.g., 304b or 304d) are alternately operated such that only one is used to supply the application units 310. For example, to establish a recirculation path, flow is directed from the operating (i.e., active) fluid distribution element (e.g., 304a or 304c) into the dispensing nozzles 312 and back through the inactive fluid distribution element (e.g., 304b or 304d) for a return to the inlet of the operating fluid distribution element via the flow control device 324. In other embodiments, the distributed pump system 300 can further comprise a recirculation valve (not shown) that would allow flow to be directed through the recirculation valve rather than the dispensing nozzles 312.

Figure 5:
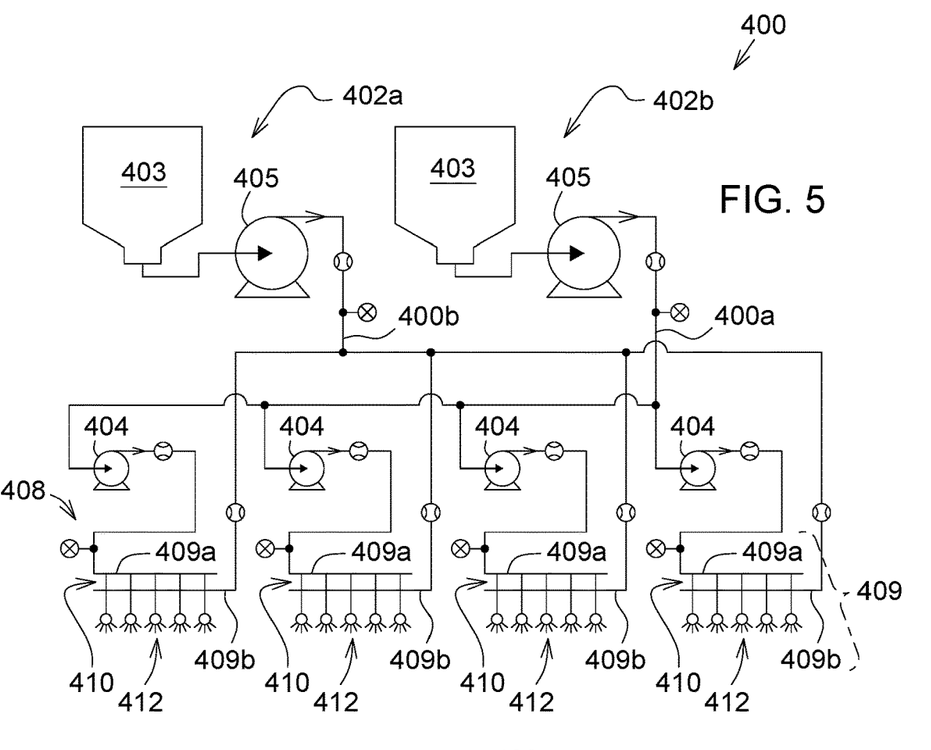
FIG. 5 is a schematic illustration of a distributed pump system according to an embodiment.
Figure 6:
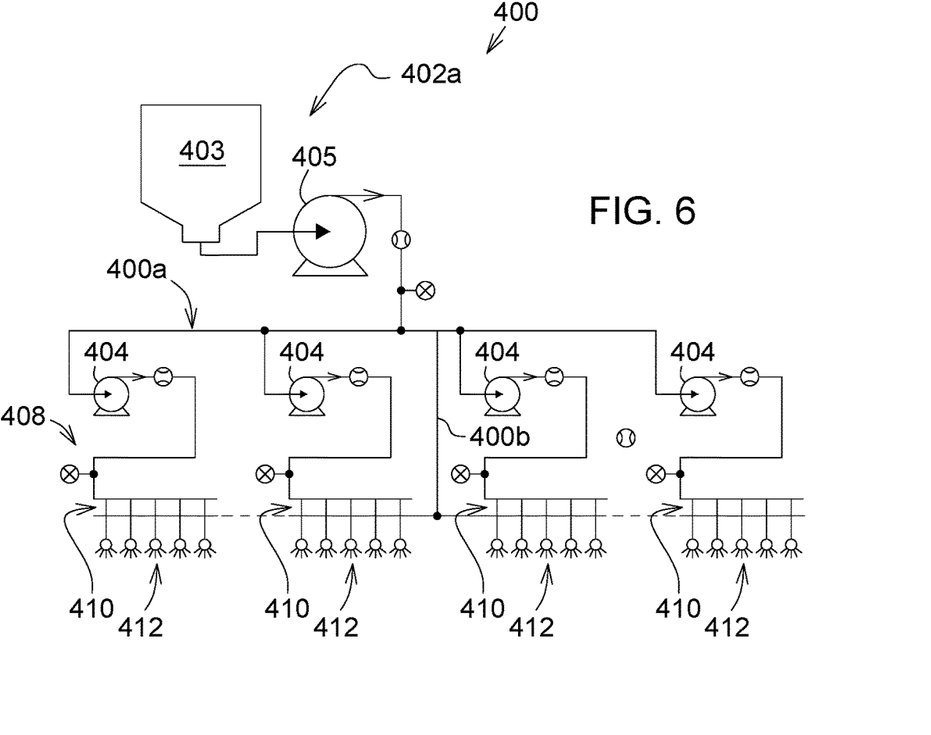
FIG. 6 is a schematic illustration of a distributed pump system according to an embodiment.

FIGS. 5-6 illustrate other alternative embodiments of the distributed pump system 300. In FIG. 5, a distributed pump system 400 is shown, which combines the functionalities of the distributed pump system 300 and a conventional single pump system. In some embodiments, the distributed pump system 400 can comprise a first pump system 400a (e.g., a distributed pump system) and a second pump system 400b (e.g., a conventional pump system) that are arranged to combine at a split path conduit 409 having a first conduit portion 409a and a second conduit portion 409b. The first pump system 400a is substantially similar to the distributed pump system 300 and will not be discussed in detail with regard to supply sources 402a, 402b and fluid distribution elements 404. It should be noted, however, that the split path conduit 409 of the distributed pump system 400 differs from that of system 300. For example, as shown, the first conduit portion 409a of the split path conduit 409 is arranged in fluid communication with an outlet of each of the fluid distribution elements 404 of the first pump system 400a, and the second portion 409b of the split path conduit 409 is arranged in fluid communication with an outlet of the supply source 402b of the second pump system 400b. Such an arrangement is particularly advantageous in that it provides for more wide-ranging and precise spray applications.

In some embodiments, the first and second pump systems 400a, 400b can be configured to operate simultaneously with one another applying the same or distinct applicator solutions based on a desired spray output. For example, the second pump system 400b can be configured to supply the applicator solution at a base rate, and the first pump system 400a can be configured to compensate for any difference in an application rate when a higher rate is required. The required compensation can be accomplished by supplying additional solution through a selected application unit 410 or by combining flows of the applicator solution at the dispensing nozzles 412 to increase flow and pressure by running the fluid distribution elements 404 in parallel.

In other embodiments, the first and second pump systems 400a, 400b can operate independently of one another to apply different applicator solutions. For example, the second pump system 400b can be configured to broadcast a first applicator solution such as a less expensive herbicide, and the first pump system 400a can be configured to spot spray with a second applicator solution (e.g., a herbicide for weeds that is resistant to the first applicator solution).

In still other embodiments, the distributed pump system 400 can comprise a single supply source having a solution reservoir 403 coupled to a charge pump 405 that supplies both the first and second pump systems 400a, 400b as shown in FIG. 6. In such an arrangement, the dual application can be achieved by a direct injection of applicator solution via the second pump system 400b just before or after the distribution by fluid distribution elements 404. Further, in either embodiment, the distributed pump system 400 is arranged to allow for smaller sizing of the fluid distribution elements 404.

Figure 7B:
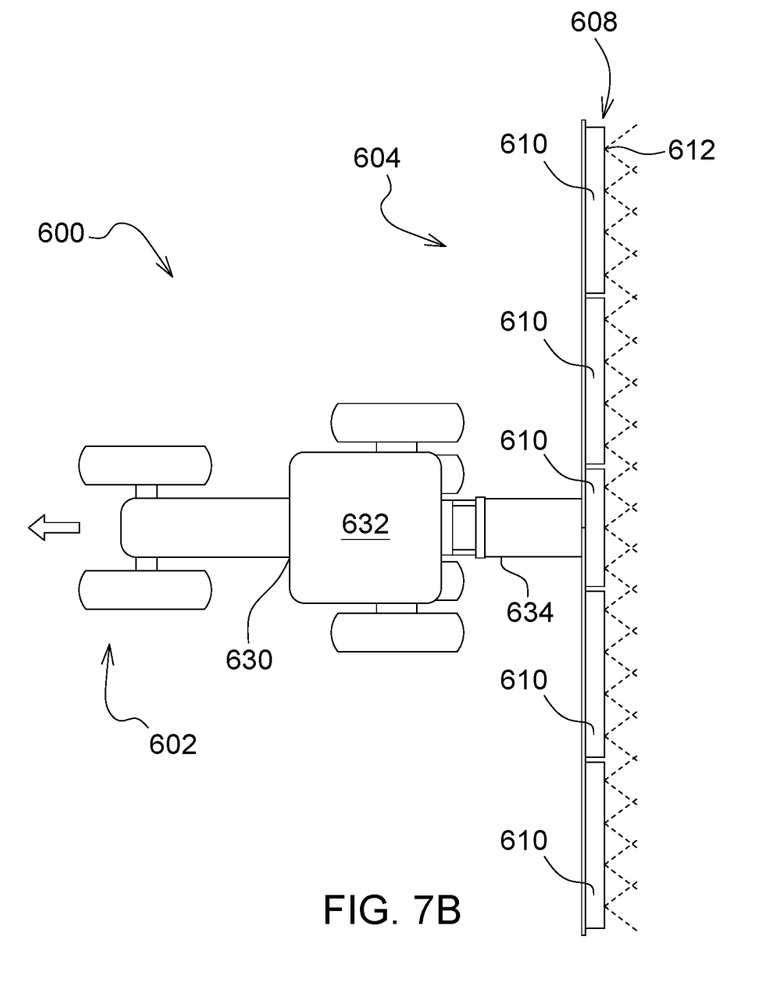
FIG. 7B is an illustration of a distributed pump system in use with an agricultural sprayer.

Referring to FIGS. 7A and 7B, exemplary agricultural sprayers 500 and 600 in which the distributed pump systems 100-400 can be incorporated are shown. As depicted, the agricultural sprayers 500 and 600 can comprise an agricultural vehicle 502, 602, a boom assembly 504, 604, which may be attached forward or rearward of the agricultural vehicle 502, 602, and an application system 508, 608 (i.e., application systems 108, 208, 308, or 408) mounted the boom assembly 504, 604. The agricultural vehicle 502, 602 (e.g., a towed sprayer or a self-propelled agricultural sprayer) can comprise a vehicle chassis 530, 630 and a control station 532, 632. A fixed or floating center frame 534, 634 can be coupled to the vehicle chassis 530, 630 and is arranged to provide additional structural support to the boom assembly 504, 604, which may, for example, include an articulated folding spray boom.

As shown in FIG. 7A, a supply source 550, which may include any of the supply sources associated with systems 100-400, can also be coupled to the center frame 534 and can be positioned between the agricultural vehicle 502 and the boom assembly 504. In other embodiments, referring, for example, to FIG. 7B, the supply source can be coupled to the agricultural vehicle 602 (not shown) or arranged external to the system 600.

In the exemplary embodiment of FIGS. 7A and 7B, the application systems 508, 608 are shown as being divided into four sections including application units 510, 610 with each having a plurality of dispensing nozzles 512, 612. Although only four sections are shown, it should be noted that more sections are typically arranged along the boom assembly 504, 604, which can extend up to approximately 25 meters in length in some embodiments. As discussed above with reference to FIGS. 1A-6, the supply of applicator solution to each of application units 510, 610 can be regulated and controlled by fluid distribution elements 104, 204, 304, 404 via the electronic control unit 115. Such an arrangement is particularly advantageous in that it allows for sectional operation of the application system 508, 608 through the selective and independent control of each application unit via the plurality of fluid distribution elements 104, 204, 304, 404 (i.e., each fluid distribution element will control the rate of solution flow into each application unit 510, 610). This in turn will provide for significantly increased spray precision and uniformity and overcomes the deficiencies of conventional approaches.

Without in any way limiting the scope, interpretation, or application of the claims appearing below, a technical effect of one or more of the example embodiments disclosed herein is a distributed pump system for agricultural sprayers. The distributed pump system provides several advantages over conventional systems. For example, the system pump systems provide higher precision and can be configured in such a way to offer both multiple zone and multiple solution applications. The distributed pump system also provides an operator with the ability to simultaneously broadcast and spot spray two different applicator solutions at one time. Further, multiple smaller distributed solution pumps can react quicker to rate changes across the application system than one larger solution pump, and when powered with an electric motor the pump can be controlled quicker and with more stability.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A distributed pump system comprising:
a supply source that includes a first solution reservoir and a second solution reservoir;
a support structure arranged on or proximate an agricultural vehicle movable across a field;
at least two fluid distribution elements mounted to the support structure and coupled at an inlet to a first conduit to provide fluid communication between the fluid distribution elements and the supply source;
a first charge pump that includes an inlet and an outlet, wherein the inlet of the first charge pump is coupled to the first solution reservoir of the supply source and the outlet of the first charge pump is coupled to the at least two fluid distribution elements;
an application system comprising at least two application units having a plurality of dispensing nozzles coupled thereto, wherein each application unit is respectively coupled to one or more of the fluid distribution elements by a second conduit;
a second charge pump that includes an inlet and an outlet, wherein the inlet of the second charge pump is coupled to the second solution reservoir of the supply source and the outlet of the second charge pump is coupled to the application system;
at least one first monitoring device coupled to the second conduit, wherein the at least one first monitoring device is associated with a respective application unit and fluid distribution element, and wherein the at least one first monitoring device is configured to sense a downstream flow parameter of the second conduit and generate a corresponding output signal; and
an electronic control unit communicatively coupled to each of the fluid distribution elements, wherein the electronic control unit is configured to dynamically adjust an input parameter of one or more of the fluid distribution elements when the sensed downstream flow parameter is above or below a predetermined threshold to maintain a desired spray output of the plurality of dispensing nozzles,
wherein the at least two fluid distribution elements comprise one or more centrifugal pumps, positive displacement pumps, variable displacement pumps, or combinations thereof.

2. The distributed pump system of claim 1, wherein:
each unit of the at least two application units includes a first end and a second end,
the outlet of the second charge pump is coupled the first end of each unit of the at least two application units, and
each element of the at least two distribution elements is coupled to at least the second end of at least one unit of the two application units.

3. The distributed pump system of claim 2, wherein a second monitoring device is coupled to the first conduit proximate the outlet of the first charge pump, and wherein the second monitoring device is configured to generate a second output signal indicative of an upstream flow parameter.

4. The distributed pump system of claim 3, wherein the electronic control unit is configured to dynamically adjust an input parameter of at least one of the first charge pump, the second charge pump, or one of the fluid distribution elements when the sensed upstream and/or downstream flow parameter is above or below a predetermined threshold to maintain a desired spray output of the plurality of dispensing nozzles.

5. The distributed pump system of claim 3, wherein the first and second monitoring device comprises at least one a pressure sensor, a pressure transducer, a flow meter, or combinations thereof.

6. The distributed pump system of claim 1, wherein each of the fluid distribution elements is independently controlled via an operator input to allow for selective activation and deactivation of each of the dispensing nozzles arranged on the application units.

7. A sprayer system comprising:
a boom assembly coupled to an agricultural vehicle;
at least two supply sources;
at least two fluid distribution elements mounted to the boom assembly and coupled at an inlet to a first conduit to provide fluid communication between the fluid distribution elements and the at least two supply sources;
a first charge pump that includes an inlet and an outlet, wherein the inlet of the first charge pump is coupled to a first solution reservoir of the at least two supply sources and the outlet of the first charge pump is coupled at an inlet of each of the at least two fluid distribution elements via the first fluid conduit;
an application system comprising at least two application units each having a dual dispensing nozzle arrangement, wherein each application unit is respectively coupled to one or more of the fluid distribution elements by a second conduit;
a second charge pump coupled to a second solution reservoir of the at least two supply sources;
at least one first monitoring device coupled to the second conduit, wherein the at least one first monitoring device is associated with a respective application unit and fluid distribution element, and wherein the at least one monitoring first device is configured to sense a flow parameter of the second conduit and generate a corresponding output signal; and
an electronic control unit communicatively coupled to each of the fluid distribution elements and the main flow control device, and wherein the electronic control unit is configured to dynamically adjust an input parameter of one or more of the fluid distribution elements when the sensed flow parameter is above or below a predetermined threshold to maintain a desired spray output,
wherein the at least two fluid distribution elements include one or more centrifugal pumps, positive displacement pumps, variable displacement pumps, or combinations thereof.

8. The distributed pump system of claim 7, wherein the dual nozzle arrangement comprises a plurality of dispensing nozzles coupled to a first portion and a second portion of a split path conduit.

9. The distributed pump system of claim 8, wherein a second monitoring device is coupled to the first conduit proximate the outlet of the first charge pump, and wherein the second monitoring device is configured to generate a second output signal indicative of an upstream flow parameter.

10. The distributed pump system of claim 9, wherein the electronic control unit is configured to dynamically adjust an input parameter of the first charge pump and/or the one or more fluid distribution elements when the sensed upstream and/or downstream flow parameter is above or below a predetermined threshold to maintain a desired spray output of the plurality of dispensing nozzles.

11. The distributed pump system of claim 9, wherein the first and second monitoring device comprises at least one a pressure sensor, a pressure transducer, a flow meter, or combinations thereof.

12. The distributed pump system of claim 7 wherein each solution reservoir is configured to contain the same or a different applicator solution.

13. The distributed pump system of claim 7, wherein each of the fluid distribution elements is independently controlled via an operator input to allow for selective activation and deactivation of each of the application units.

14. The distributed pump system of claim 7 further comprising an auxiliary flow control device is configured to selectively control a flow path of applicator solution supplied to the dual nozzle arrangement.

15. A distributed pump system for an agricultural vehicle movable across a field, the distributed pump system comprising:
a plurality of solution reservoirs;
a support structure arranged on or proximate the agricultural vehicle;
at least two fluid distribution elements mounted to the support structure and coupled at an inlet to a first conduit to provide fluid communication between the fluid distribution elements and the plurality of solution reservoirs;
a first charge pump that includes an inlet and an outlet, wherein the inlet of the first charge pump is coupled to a first solution reservoir of the plurality of solution reservoirs and the outlet of the first charge pump is coupled to the at least two fluid distribution elements;
an application system comprising at least two application units having a plurality of dispensing nozzles coupled thereto, wherein a first end of each application unit is respectively coupled to one or more of the fluid distribution elements by a second conduit, and
a second charge pump that includes an inlet and an outlet, wherein the inlet of the second charge pump is coupled to a second solution reservoir of the plurality of solution reservoirs and the outlet of the second charge pump is coupled to a second end of each application unit,
wherein the at least two fluid distribution elements comprise one or more centrifugal pumps, positive displacement pumps, variable displacement pumps, or combinations thereof.

16. The distributed pump system of claim 15 further comprising:
at least one first monitoring device coupled to the second conduit, wherein the at least one first monitoring device is associated with a respective application unit and fluid distribution element, and wherein the at least one first monitoring device is configured to sense a downstream flow parameter of the second conduit and generate a corresponding output signal; and
an electronic control unit communicatively coupled to each of the fluid distribution elements, wherein the electronic control unit is configured to dynamically adjust an input parameter of one or more of the fluid distribution elements when the sensed downstream flow parameter is above or below a predetermined threshold to maintain a desired spray output of the plurality of dispensing nozzles.

* * * * *